US011496286B2

(12) United States Patent
Duffy et al.

(10) Patent No.: US 11,496,286 B2
(45) Date of Patent: Nov. 8, 2022

(54) DIFFERENTIAL PRIVACY WITH CLOUD DATA

(71) Applicant: Apple Inc., Cupertino, CA (US)

(72) Inventors: William T. Duffy, San Jose, CA (US); Andrew H. Vyrros, San Francisco, CA (US); Yannis Minadakis, South San Francisco, CA (US); Andrew R. Byde, Cardiff (GB); Giulia Pagallo, Cupertino, CA (US)

(73) Assignee: Apple Inc., Cupertino, CA (US)

(*) Notice: Subject to any disclaimer, the term of this patent is extended or adjusted under 35 U.S.C. 154(b) by 27 days.

(21) Appl. No.: 15/815,611

(22) Filed: Nov. 16, 2017

(65) Prior Publication Data

US 2018/0198602 A1 Jul. 12, 2018

Related U.S. Application Data

(60) Provisional application No. 62/454,684, filed on Feb. 3, 2017, provisional application No. 62/443,736, filed on Jan. 8, 2017.

(51) Int. Cl.
*H04L 9/00* (2022.01)
*G06F 21/62* (2013.01)
(Continued)

(52) U.S. Cl.
CPC .......... *H04L 9/008* (2013.01); *G06F 21/6245* (2013.01); *G06F 40/117* (2020.01);
(Continued)

(58) Field of Classification Search
CPC ..... H04L 9/008; H04L 9/0816; G06F 17/218; G06F 21/6245; G06F 17/27; G06F 2221/2107; G06F 21/6254
See application file for complete search history.

(56) References Cited

U.S. PATENT DOCUMENTS 5,960,080 A * 9/1999 Fahlman ............. G06F 21/6209
380/252
7,546,465 B2 * 6/2009 Kent, Jr. ............. G06Q 10/107
713/168

(Continued)

OTHER PUBLICATIONS

"G. Cormode, C. Procopiuc, D. Srivastava, and T. Tran, Differentially Private Summaries for Sparse Data, 2012, in ICDT, pp. 1-13" (Year: 2012).*

(Continued)

*Primary Examiner* — Saleh Najjar
*Assistant Examiner* — Nhan Huu Nguyen
(74) *Attorney, Agent, or Firm* — Kilpatrick Townsend & Stockton LLP

(57) ABSTRACT

Embodiments described herein enable data associated with a large plurality of users to be analyzed without compromising the privacy of the user data. In one embodiment, a user can opt-in to allow analysis of clear text of the user's emails. An analysis process can then be performed in which an analysis service receives clear text of an email of a client device; processes the clear text of the email into one or more tokens having one or more tags; enriches one or more tokens in the processed email using data associated with a user of the client device and the one or more tags; and processes the clear text and one or more enriched tokens to generate a data set of one or more feature vectors.

21 Claims, 9 Drawing Sheets

(51) Int. Cl.
  *G06F 40/20* (2020.01)
  *G06F 40/117* (2020.01)
  *H04L 9/08* (2006.01)

(52) U.S. Cl.
  CPC ...... *G06F 40/20* (2020.01); *G06F 2221/2107* (2013.01); *H04L 9/0816* (2013.01)

(56) References Cited

U.S. PATENT DOCUMENTS

| | | | | |
|---|---|---|---|---|
| 8,006,093 | B2* | 8/2011 | Kent, Jr. | G06F 21/6245 713/168 |
| 8,346,532 | B2* | 1/2013 | Chakra | G16H 10/60 726/28 |
| 8,458,487 | B1* | 6/2013 | Palgon | H04L 63/0807 713/185 |
| 8,484,478 | B2* | 7/2013 | Kent, Jr. | H04L 63/0428 713/168 |
| 8,620,918 | B1* | 12/2013 | Ben-Artzi | G06F 16/353 707/737 |
| 8,649,552 | B2* | 2/2014 | Balakrishnan | G06F 21/6254 380/246 |
| 9,058,813 | B1* | 6/2015 | Blanksteen | G10L 15/19 |
| 9,633,048 | B1* | 4/2017 | Dutta | G06F 16/58 |
| 9,946,895 | B1* | 4/2018 | Kruse | G06F 21/6227 |
| 10,216,717 | B2* | 2/2019 | Poozhiyil | G06F 40/18 |
| 10,318,762 | B1* | 6/2019 | Buckingham | H04L 63/0421 |
| 10,469,425 | B1* | 11/2019 | Conley | H04L 63/0281 |
| 2003/0053622 | A1 | 3/2003 | Bruen et al. | |
| 2004/0078595 | A1* | 4/2004 | Kent, Jr. | G06Q 10/107 713/160 |
| 2004/0078596 | A1* | 4/2004 | Kent, Jr. | H04L 63/0457 713/160 |
| 2004/0199596 | A1* | 10/2004 | Nutkis | G06F 21/60 709/207 |
| 2006/0075228 | A1* | 4/2006 | Black | H04L 63/104 713/167 |
| 2008/0172745 | A1* | 7/2008 | Reinart | G06F 21/6245 726/26 |
| 2008/0181396 | A1* | 7/2008 | Balakrishnan | G06F 21/62 380/28 |
| 2009/0208001 | A1* | 8/2009 | Kent, Jr. | G06F 21/6245 380/42 |
| 2010/0011000 | A1* | 1/2010 | Chakra | G06F 21/6209 707/E17.005 |
| 2010/0106980 | A1* | 4/2010 | Kerschbaum | H04L 9/002 713/193 |
| 2010/0312549 | A1* | 12/2010 | Akuwudike | G06F 16/367 704/9 |
| 2011/0064221 | A1 | 3/2011 | McSherry et al. | |
| 2011/0208763 | A1 | 8/2011 | McSherry et al. | |
| 2012/0023323 | A1* | 1/2012 | Kent, Jr. | H04L 9/3247 713/150 |
| 2012/0143922 | A1 | 6/2012 | Rane et al. | |
| 2012/0204026 | A1 | 8/2012 | Shi et al. | |
| 2012/0239540 | A1* | 9/2012 | Rogers, Jr. | H04W 12/12 705/35 |
| 2012/0245925 | A1* | 9/2012 | Guha | G06F 40/20 704/9 |
| 2012/0296898 | A1 | 11/2012 | Cormode et al. | |
| 2012/0303570 | A1* | 11/2012 | Stevens, III | G06N 20/00 706/50 |
| 2012/0316956 | A1 | 12/2012 | Nath et al. | |
| 2013/0145473 | A1 | 6/2013 | Cormode et al. | |
| 2013/0212690 | A1 | 8/2013 | Farwaz et al. | |
| 2013/0253908 | A1* | 9/2013 | Zhai | G06F 40/274 704/9 |
| 2013/0268765 | A1* | 10/2013 | Kent, Jr. | G06F 21/6245 713/179 |
| 2014/0039877 | A1* | 2/2014 | Guenigault | G06F 40/131 704/9 |
| 2014/0163954 | A1* | 6/2014 | Joshi | G06F 17/276 704/9 |
| 2014/0196151 | A1 | 7/2014 | Mishra et al. | |
| 2014/0245118 | A1* | 8/2014 | Poozhiyil | H04L 51/00 715/212 |
| 2014/0278051 | A1* | 9/2014 | McGavran | G06N 20/00 701/400 |
| 2014/0281572 | A1* | 9/2014 | Wang | G06F 21/6254 713/189 |
| 2014/0283091 | A1 | 9/2014 | Zhang et al. | |
| 2015/0082142 | A1* | 3/2015 | Williams | G06F 40/232 715/231 |
| 2015/0161406 | A1* | 6/2015 | Fox | G06F 21/6245 726/27 |
| 2015/0193638 | A1* | 7/2015 | Cook | G06Q 20/34 726/27 |
| 2015/0293923 | A1 | 10/2015 | Eide et al. | |
| 2015/0339493 | A1 | 11/2015 | Ioannidis et al. | |
| 2015/0371059 | A1 | 12/2015 | Bilogrevic et al. | |
| 2016/0071170 | A1 | 3/2016 | Massoulie et al. | |
| 2016/0203333 | A1 | 7/2016 | Fawaz et al. | |
| 2016/0224524 | A1* | 8/2016 | Kay | G06F 3/0237 |
| 2017/0004331 | A1* | 1/2017 | Weldon | G06T 11/60 |
| 2017/0097996 | A1* | 4/2017 | Gullett | G06Q 10/063 |
| 2017/0324686 | A1* | 11/2017 | Sheth | H04L 47/125 |

OTHER PUBLICATIONS

Roy, S. Setty, A. Kilzer, V. Shmatikov, E. Witchel. "Airavat: Security and Privacy for MapReduce." NSDI, 2010.
Cynthia Dwork and Aaron Roth. "The Algorithmic Foundations of Differential Privacy." Foundations and Trends in Theoretical Computer Science, vol. 9, Nos. 3-4, Aug. 2014.
Chao Li and Gerome Miklau. "An Adaptive Mechanism for Accurate Query Answering under Differential Privacy." Proc. VLDB Endowment, pp. 514-525, Feb. 2012.
Fanti, G., Pihur, V. and Erlingsson, Li. "Building a RAPPOR with the Unknown: Privacy-Preserving Learning of Associations and Data Dictionaries." Proceedings on Privacy Enhancing Technologies. Volume 2016, Issue 3, pp. 11-61.
Dwork, C., McSherry, F., Nissim, K., Smith, A. "Calibrating Noise to Sensitivity in Private Data Analysis." Theory of :; ryptography. TCC 2006. Lecture Notes in Computer Science, vol. 3876. Springer, Berlin, Heidelberg.
Vadhan, Salil. "The Complexity of Differential Privacy." Center for Research on Computation & Society John A. Paulson School of Engineering & Applied Sciences Harvard University, Aug. 9, 2016.
Chaudhuri, S., Kaushik, R. and Ramamurthy, R. "Database Access Control & Privacy: Is There a Common Ground?" In: Proceedings of CIDR 2011, pp. 96-103 (2011 ).
Liu, C., Chakraborty, S. and Mittal, P. "Dependence makes you Vulnerable: Differential Privacy under Dependent Tuples."NOSS '16, Feb. 21-24, 2016.
Ding, B., Winslett, M., Han, J., & Li, Z. "Differentially Private Data Cubes: Optimizing Noise Sources and Consistency." In Proceedings of SIGMOD 2011 and PODS 2011,2011, pp. 217-228.
Mohammed, N., Chen, R., Fung, B., and Yu, P. "Differentially Private Data Release for Data Mining." KDD'11, Aug. 21-24, 2011, pp. 493-501.
Ebadi, H., Sands, D. Schneider, G. "Differential Privacy: Now it's Gelling Personal." In: POPL 2015, ACM, 2015, pp. 59-81.
Kueyang Hu, et al. "Differential Privacy in Telco Big Data Platform." Proceedings of the VLDB Endowment, 8(12): 1692-1703, 2015.
Alvin, M.S., et al. "Differential Privacy: On the Trade--Off between Utility and Information Leakage." Proceedings of the 8th International Workshop on Formal Aspects of Security & Trust (FAST11 ), Springer, LNCS 7140, 2011.
Haeberlen, Andreas, et al. "Differential Privacy Under Fire." In USENIX'11, 2011.
Narayan, Arjun. "Distributed Differential Privacy and Applications." Presented to the Faculties of the University of Pennsylvania, 2015.
Ning Zhang, Ming Li, and Wenjing Lou. "Distributed Data Mining with Differential Privacy." In IEEE International :; Conference on Communications, 2011.

(56) References Cited

OTHER PUBLICATIONS

Narayan, Arjun Ravi, "Distributed Differential Privacy and Applications." Publicly Accessible Penn Dissertations, Jan. 1, 2015.
Hamid Ebadi and David Sands. "Featherweight PINQ." CoRR, 2015.
Mohan, Prashanth. "GUPT: Privacy Preserving Data Analysis made Easy," Proceedings of the 2012 ACM SIGMOD International Conference on Management of Data, May 20-24, 2012.
Ikkus, I. et al. "Non-tracking Web Analytics." CCS'12, ACM, Oct. 16-18, 2012.
Lee, Sangmin, et al. "[pi]box: A Platform for Privacy-Preserving Apps." In 1 0th USENIX Symposium on Networked Systems Design and Implementation (NSDI '13),2013.
R. A. Popa, et al. "Privacy and Accountability for Location-based Aggregate Statistics." In Proceedings of the 18th ACM Conference on Computer and Communications Security, Oct. 17-21, 2011.
Kandappu, Thivya, et al. "Privacy in Crowdsourced Platforms." Springer International Publishing: Privacy in a Digital, Networked Wo?d. 2015, pp. 57-84.
Apple Inc. IOS Security Guide—Mar. 2017.
J. M. Abowd. The Challenge of Scientific Reproducibility and Privacy Protection for Statistical Agen-cies. https://www2.census.gov/cac/sac/meetings/2016-09/2016-abowd.pdf, Sep. 15, 2016. Census Scientific Advisory Committee.
R. Bassily and A. Smith. Local, Private, Efficient Protocols for Succinct Histograms. In STOC, 2015.
G. Cormode and S. Muthukrishnan. An improved data stream summary: The count-min sketch and its applications. J. Algorithms, 55(1):58-75, Apr. 2005.
J. C. Duchi, M. Jordan, M. J. Wainwright, et al. Local Privacy and Statistical Minimax Rates. In FOCS. IEEE, 2013.
C. Dwork, M. Naor, T. Pitassi, and G. N. Rothblum. Differential privacy under continual observation. In Proceedings of the Forty-second ACM Symposium on Theory of Computing, STOC '10, pp. 715-724, New York, NY, USA, 2010. ACM.
Ú. Erlingsson, V. Pihur, and A. Korolova. RAPPOR: Randomized Aggregatable Privacy-Preserving Ordinal Response. In ACM CCS, 2014.
M.Gaboardi,J.Honaker,G.King,K.Nissim,J.Ullman,S.Vadhan,andJ.Murtagh.PSI($\Psi$):a Private data Sharing Interface. In Theory and Practice of Differential Privacy, 2016.
J. Hsu, S. Khanna, and A. Roth. Distributed Private Heavy Hitters. In ICALP. 2012.
S. P. Kasiviswanathan, H. K. Lee, K. Nissim, S. Raskhodnikova, and A. Smith. What Can We Learn Privately? SIAM Journal on Computing, 40(3):793-826, 2011.
A. Machanavajjhala, D. Kifer, J. Abowd, J. Gehrke, and L. Vilhuber. Privacy: Theory Meets Practice on the Map. In Proceedings of the 2008 IEEE 24th International Conference on Data Engineering, ICDE '08, pp. 277-286, Washington, DC, USA, 2008. IEEE Computer Society.
F. D. McSherry. Privacy integrated queries: An extensible platform for privacy-preserving data anal-ysis. In Proceedings of the 2009 ACM SIGMOD International Conference on Management of Data, SIGMOD '09, pp. 19-30, New York, NY, USA, 2009. ACM.
N. Mishra and M. Sandler. Privacy via Pseudorandom Sketches. In PODS, 2006.
Z. Qin, Y. Yang, T. Yu, I. Khalil, X. Xiao, and K. Ren. Heavy hitter estimation over set-valued data with local differential privacy. In Proceedings of the 2016 ACM SIGSAC Conference on Computer and Communications Security, CCS '16, pp. 192-203, New York, NY, USA, 2016. ACM.

* cited by examiner

Hi Giulia,

Are you guys still interested in going skiing to Tahoe? We are planning to spend 3 nights, from March 11 to March 14.

We are looking for a house rental in Alpine Meadows.

Hope you can join us. Call me on my cell when you have a chance, (800) 123-4567.

Ciao,

Christina

FIG. 7A

Hi <name>,

Are you guys still interested in going skiing to <location>? We are planning to spend <number> nights, from <date> to <date>.

We are looking for a house rental in <location>.

Hope you can join us. Call me on my cell when you have a chance, <phone number>.

Ciao,

<name>

FIG. 7B

Hi <name><sentence boundary>

<sentence boundary>Are you guys still interested in going skiing to <location><sentence boundary>
<sentence boundary>We are planning to spend <number> nights, from <date> to <date><sentence boundary>

<sentence boundary>We are looking for a house rental in <location><sentence boundary>

<sentence boundary>Hope you can join us<sentence boundary> <sentence boundary> Call me on my cell when you have a chance, <my-phone number><sentence boundary>
...

FIG. 7C

| Occurs | Date | Orig Geo | Lang | Data |
|---|---|---|---|---|
| 1712 | 2016-07-15 | US | en-US | are you still |
| 1683 | 2016-07-15 | US | en-US | <sentence boundary> We are |
| 1672 | 2016-07-15 | US | en-US | Hi <name><sentence boundary> |
| 1650 | 2016-07-15 | US | en-US | <sentence boundary><name><sentence boundary> |
| 1589 | 2016-07-15 | US | en-US | you still interested |
| 1503 | 2016-07-15 | US | en-US | looking for al |

FIG. 7D

DIFFERENTIAL PRIVACY WITH CLOUD DATA

CROSS-REFERENCE

This application claims priority to U.S. Provisional Patent Application No. 62/443,736 filed Jan. 8, 2017, which is hereby incorporated herein by reference. This application also claims priority to U.S. Provisional Patent Application No. 62/454,684 filed Feb. 3, 2017, which is hereby incorporated herein by reference

TECHNICAL FIELD

This disclosure relates to the field of using user data to generate data sets for use on a client device, while protecting user privacy.

BACKGROUND

A user of a client device can generate email, text messages, voice mails, documents, and other personal data on the client device. A user may want the client device to learn how to write, speak, or spell the way that most users would write, speak, or spell. To learn the way that users write, speak, or spell, a server could collect a large amount of user data from a large number of users to perform the learning. However, collection of user data can compromise user privacy with each piece of data collected from a user. Also, a user may want to have a say, or some control, over whether a server collects data from the user of the client device. In the prior art, the collected data of clear text of emails have been used to screen for spam email messages and malware. In the prior art, the user does not have control over whether to opt-in to collection of clear text data. Thus, a user is left with the choice of having his/her email data collected and analyzed, which can seriously compromise user privacy, or not using the email service at all.

SUMMARY OF THE DESCRIPTION

Embodiments described herein enable data associated with a large plurality of users to be analyzed without compromising the privacy of the user data. In one embodiment, a user can opt-in to allow analysis of clear text of the user's emails. An analysis process can then be performed in which an analysis service receives clear text of an email of a client device; processes the clear text of the email into one or more tokens having one or more tags; enriches one or more tokens in the processed email using data associated with a user of the client device and the one or more tags; and processes the clear text and one or more enriched tokens to generate a data set of one or more feature vectors.

One embodiment provides for a computer-implemented method comprising receiving, by a service, clear text of an email of a client device; processing, by the service, the clear text of the email into one or more tokens having one or more tags; enriching one or more tokens in the processed email using data associated with a user of the client device and the one or more tags; and processing the clear text and one or more enriched tokens to generate a data set of one or more feature vectors. In one embodiment, the method additionally comprises encrypting the clear text of the email, in response to receiving the email; storing the encrypted email; and decrypting the encrypted email before processing the clear text of the email.

One embodiment provides for a non-transitory computer readable medium can store executable instructions, that when executed by a processing system, can perform any of the functionality described above.

In yet another embodiment, a processing system coupled to a memory is provided. The memory is programmed with executable instructions which, when the instructions are executed by the processing system, cause the processing system to perform any of the functionality described above.

Other features and advantages will be apparent from the accompanying drawings and from the detailed description.

BRIEF DESCRIPTION OF THE DRAWINGS

Embodiments of the invention are illustrated by way of example, and not by way of limitation, in the figures of the accompanying drawings in which like reference numerals refer to similar elements.

FIGS. 7A-7D illustrate tokenizing text into n-grams and enriching the tokenized n-gram according to some embodiments.

DETAILED DESCRIPTION

Figure 1:
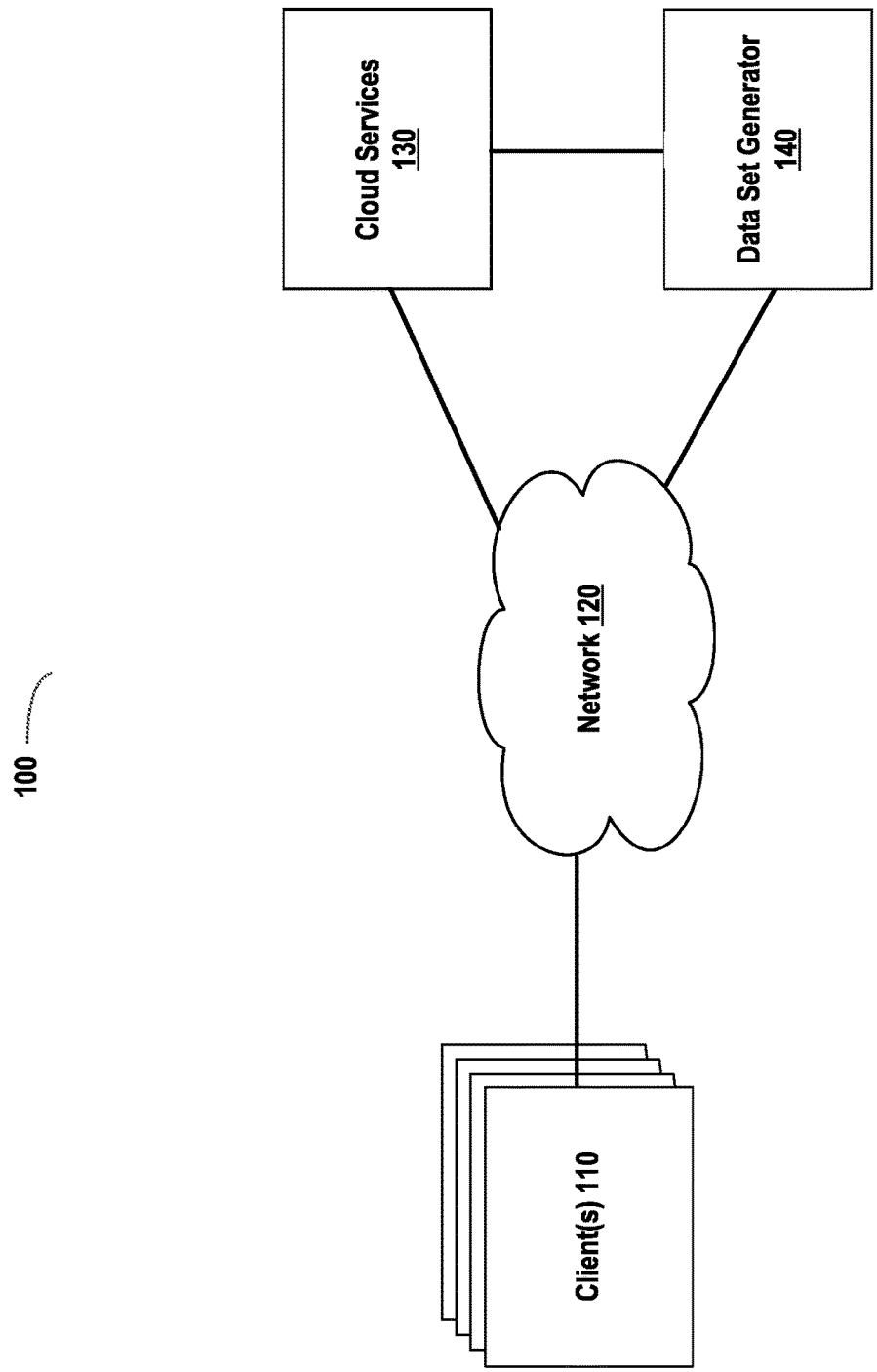
FIG. 1 illustrates, in block form, an overview of a system for generating predictive data sets from email and other user data, after opt-in by the user, according to some embodiments.

In the following detailed description of embodiments, reference is made to the accompanying drawings in which like references indicate similar elements, and in which is shown by way of illustration manners in which specific embodiments may be practiced. These embodiments are described in sufficient detail to enable those skilled in the art to practice the invention, and it is to be understood that other embodiments may be utilized and that logical, mechanical, electrical, functional and other changes may be made without departing from the scope of the present disclosure. The following detailed description is, therefore, not to be taken in a limiting sense, and the scope of the present invention is defined only by the appended claims.

Systems and methods are described for generating data sets from email and other user data, for use on a client device of the user. Data sets can be generated from cloud data or from any other centralized data source, after user opt-in to use of the user data. In the detailed description that follows, email is used as an example of user data that can be used to create data sets for use on client devices. Other user data sources, including audio, voice, and image data are contemplated, after a user opts-in to use of the data. After a user opts-in to allow a service to utilize the user's emails, the service can receive clear text of an email of a client device of the user. The service can process the clear text of the email into one or more tokens having one or more tags. The processed portion of the clear text can be limited to the body of the email. The tokens can be enriched using data associated with the user, such as a calendar or contacts list of the user, and by using the tags associated with the tokens. From the tokenized and enriched processed email, one or more feature vectors can be generated as a data set that can be used by one or more application programs on the user's client device. Data sets can be used by predictive text features of an application, or by natural language processing features of an application.

In one embodiment, a received email is encrypted on receipt by the service, stored in encrypted form, and is decrypted before processing begins. In one embodiment, the feature vectors can be encrypted, and a differential privacy algorithm can be applied to the encrypted feature vectors by the service. The service can them select one or more of the encrypted feature vectors from the encrypted differentially privatized data set and the selected encrypted feature vectors can be decrypted and user to generate a data set to be used by one or more applications on client devices. The data sets can be used to implement natural language features or predictive keyboard typing algorithms (where the predictive algorithms predict the next character or word before the user types it, such as auto-correction or predicting words in phrases as they are typed) or other features for use on all client devices that receive the data sets. Data collected to generate the data sets identifies common patterns in text, such as a phrase that comes before a phone number, a first person setting up a place to meet another person, and other common linguistic patterns that occur within a context such as a message or email exchange, a voice command to a voice-activated assistant, and the like. No personal user data is leaked during this process, and data processing to extract feature vectors and text patterns is applied in a secure environment.

Embodiments described herein make use of a differential privacy algorithm. The following is a formal definition of local differential privacy. Let n be the number of clients in a client-server system, let $\Gamma$ be the set of all possible transcripts generated from any single client-server interaction, and let $T_i$ be the transcript generated by a differential privacy algorithm A while interacting with client i. Let $d_i \in S$ be the data element for client i. Algorithm A is $\varepsilon$-locally differentially private if, for all subsets $T \subseteq \Gamma$, the following holds:

$$\forall i \in [n], d \in S \left| \ln \frac{Pr[Ti \in \Gamma \mid di = d]}{Pr[Ti \in \Gamma \mid di = \text{null}]} \right| \leq \varepsilon.$$

Here, $d_i$=null refers to the case where the data element for client i is removed. In other words, an adversary having n−1 data points of a data set cannot reliably test whether the $n^{th}$ data point was a particular value. Thus, a differentially privatized dataset cannot be queried in a manner that enables the determination of any particular user's data.

While differential privacy techniques are described herein, other methods of privatizing user data can be employed as an alternative to or in addition to the differential privacy techniques described herein. Additional privatization techniques can include secure multi-party computation and homomorphic encryption. Secure multi-party computation parties to jointly compute a function over their inputs while keeping those inputs private. Homomorphic encryption is a form of encryption that allows computations to be carried out on ciphertext (encrypted data), thus generating an encrypted result which, when decrypted, matches the result of operations performed on the plaintext.

Some embodiments described herein can include one or more application programming interfaces (APIs) in an environment with calling program code interacting with other program code being called through the one or more interfaces. Various function calls, messages or other types of invocations, which further may include various kinds of parameters, can be transferred via the APIs between the calling program and the code being called. In addition, an API may provide the calling program code the ability to use data types or classes defined in the API and implemented in the called program code.

The present disclosure recognizes that the use of personal information data collected from a large population of users, in the present technology, can be used to the benefit of all or many users while still maintaining the privacy of individual users. User data is used after a user opts-in to use of the user data in accordance with the functionality described herein, and other uses. For example, a user opts-in to the use of the user's email data to generate data sets that can enhance the functionality of the user's client device, such as predicting text in sentences and other predictive features. Accordingly, use of such personal information data enables calculated control of the delivered content. Further, other uses for personal information data that benefit the user are also contemplated by the present disclosure.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out"

of participation in the collection of personal information data during registration for services. In another example, users can select not to provide location information for targeted content delivery services. In yet another example, users can select to not provide precise location information, but permit the transfer of location zone information.

FIG. 1 illustrates, in block form, an overview of a system 100 for generating predictive data sets from email and other user data, after opt-in by the user, according to some embodiments. Predictive data sets can be generated then incorporated into one or more asset catalogs that can be distributed to client devices to improve functionality of the client device. In an embodiment, a predictive data set can be used by a client device to predict words or phrases when a user is generating text in, e.g., an email, a text message, or a voice activated service such as Apple® SIRI®. The system can receive email and other cloud service data (collectively, "user data") from a large plurality of users that have opted-in to having their user data processed to find patterns of features in the data that can be used on client devices to implement predictive functionality. As described below, user privacy is maintained through a combination of abstraction, encryption, filtering, and differential privacy. Abstraction can include substituting a tag for personally identifying information. Encryption includes encrypting emails that are stored awaiting processing and encrypting extracted features from emails before application of differential privacy to the encrypted features. Encrypted features are filtered so that only features having a high occurrence are processed, further protecting privacy of each user.

Client devices 110, each associated with a user in a large plurality of users (crowdsource), can be coupled to one or more cloud services servers ("cloud service server 130") via network 120. Cloud service server 130 can be connected to one or more data set generator servers ("data set server 140"). Each client device 110 can send and receive clear text messages such as email, text message, SMS, other user data, such as a contact card, calendar event, and the like ("message"). A user of a client device 110 can opt-in to the cloud services server 130 using the clear text of user of the client device 110. In an embodiment, the opt-in of the user applies to all devices associated with an account of the user that are known to the cloud services server 130. Cloud services server 130 can include a message ingestion service that receives an outbound message from a sending client device 110 or receives an inbound message destined for a receiving client device 110. The ingestion service can encrypt the received message with a key known to the cloud service server 130. In an embodiment, the key is a symmetric key. In an embodiment, the key is known only to the cloud services server 130 and data set server 140 and the key is not known to client devices 110. After encrypting received messages, cloud services server 130 can store the encrypted messages. In an embodiment, encrypted messages can be stored for a predetermined period of time and then deleted. In an embodiment, the encrypted messages can be stored for a 30-day rolling window, such that 30 days after a message is received, encrypted, and stored, the encrypted message can be deleted from the cloud services server 130.

Data set server 140 can receive encrypted messages from cloud services server 130. In an embodiment, data set server 140 can be coupled with cloud services server 130 via network 120. In an embodiment, cloud services server 130 and data set server 140 can comprise a single server system. Hardware for implementing the cloud services server 130 and/or data set server 140 is described below with reference to FIG. 9. Data set server 140 can decrypt encrypted messages received from cloud services server 130 to obtain the clear text of the messages. Data set server 140 can process the clear text of each message. In an embodiment, processing a message can comprise obtaining metadata from the message, including language and region information, sender and receiver information of the message, and obtaining the body text of the message. Message headers can be removed. The body text of a message can be parsed into sentence segments or "n-grams" using natural language processing techniques. An n-gram can be a sentence segment or linguistic fragment having a length of "n" where n is a positive integer. For example, for a message text, "I changed my phone number to 800-555-1212," the text can be parsed into a tokenized n-gram wherein personally identifiable information (PII) can be privatized using place-holding tokens. An example tokenization of the aforementioned example message text could be, "I changed my phone number from <phone number> to <new-phone number><sentence boundary>" having length of 10. In another example, a message text could be, "Let's meet at the Main St. Pizzeria." The tokenization of the text into an n-gram can be, e.g., "Let's meet at <location><sentence boundary>" having an n-gram length of 5. In an embodiment, parsing can include parsing sentences or other language constructs into n-grams having one or more tags, such as a <me> or <my> tag and a <you> tag to substitute for proper names; a <phone number> tag to substitute for an actual phone number; a <date> tag to substitute for an actual date; a <number> tag to substitute for a numeric value; and a <sentence boundary> tag or a <phrase delimiter> tag to identify complete sentences or portions of sentences. Tags of n-grams can be enriched with data from user-specific sources, such as a user calendar or a user contacts database, without compromising privacy. If example text of a message includes the user's phone number, then the tokenization process can look up the phone number in the user's contacts file, determine that the phone number is the user's phone number, and replace the phone number with the tag <my-phone number>. An enriched tag can be, e.g., <my-phone number> or <your-phone number>, <my-birthday>, <my-office>, <my-home>, <today-date>, etc. After processing, the tokenized enriched n-grams are free of personally identifiable information (PII) such that the processed message is not identifiable to a particular user. In another example, a message may contain the text, "Hey. I am Giulia. My phone number is #5555." The text can be processed to "Hey. I am <name>. My phone number is <phone number>." The processed text can be stored as a feature vector representation, "(phone, person near5, phone number). The feature vector can be included in a data set that is included in an asset catalog update to client devices. The feature vector can be used by an application on a client device to implement a feature that automatically generates a contact in a user's contacts file in response to detecting that a user has typed text matching the feature vector. Processed text can also be used to generate data sets that are used to implement predictive functionality on client devices. Predictive functionality can include improved models for auto-correction and prediction by extracting common sentences used by users, where the position of each word in the sentence is recorded as well as the part of the speech of each word, e.g. noun, adjective, etc.

Data set server 140 can further extract features from the enriched tokenized n-grams. Features can include textual patterns, such as the phrase, "I changed my phone number from <my-phone number> to <new-phone number>," or "Let's meet at <location>," or other language patterns in the n-grams. The features can be encrypted and stored by data set server 140 for later, aggregation and additional processing. An example of processing clear text of a message is shown in FIGS. 7A-7D, described below. Upon a triggering event, such as a predetermined time or a predetermined size of collected data for processing, the set of encrypted feature vectors can be processed. Feature vectors can be sorted into length such that feature vectors of a certain n-gram length are processed at a same time. Feature vectors having a same length and same tags can be accumulated, producing a count of each feature vector. Feature vectors having a count less than a threshold value can be discarded as not having sufficient frequency to be used for machine learning. In an embodiment, the threshold can be a predetermined threshold value. In an embodiment, the threshold value can be determined from the frequency counts of feature vectors having a same length. In an embodiment, the threshold can be determined from the total size of the data set of feature vectors of all sizes. In an embodiment, the threshold can be determined from the number of messages processed. The feature set, optionally filtered by a threshold value, can then be encrypted and stored.

A differential privacy engine of the data set server 140 can read the encrypted, stored feature sets, generate a differentially private sketch of each feature vector in a feature set, and accumulate the differentially private encrypted sketches of the feature vectors of a large plurality of feature sets. Differentially private encrypted feature vectors having an accumulated frequency less than a threshold value can be discarded as having an insufficient frequency to be used for machine learning. Differentially private encrypted feature vectors can be decrypted. Clear text feature vectors can be generated and used to generate a data set that can be used for predictive functionality on client devices.

Network 120, that interconnects clients 110, cloud services server 130 and data set server 140, can be any type of network, such as Ethernet, Token Ring, Firewire, USB, Fibre Channel, or other network type.

Figure 2:
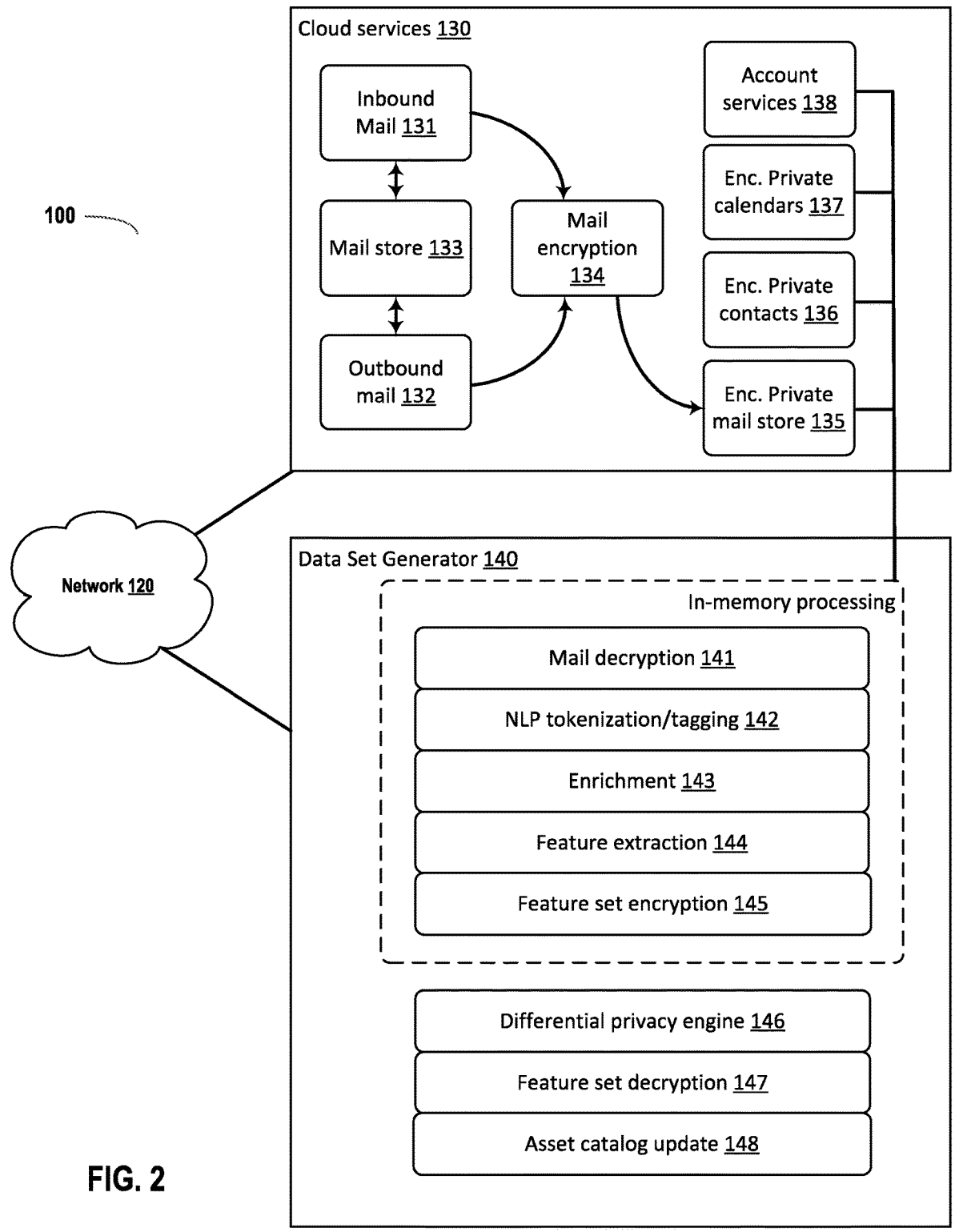
FIG. 2 illustrates, in block form, a detailed view of a system for generating predictive data sets from email and other user data, after opt-in by the user, according to some embodiments.

FIG. 2 illustrates, in block form, a detailed view of a system 100 for generating predictive data sets from email and other user data, after opt-in by the user, according to some embodiments.

Client devices 110 that are shown in FIG. 1 are omitted from FIG. 2 for clarity. Cloud services server 130 can be coupled to data set server 140 via network 120. In an embodiment, cloud services server 130 can be coupled to data set server 140 by a high-speed backplane or other server-to-server interconnect. In an embodiment, cloud services server 130 and data set server 140 can be implemented on a single server system or a cluster of interconnected servers. Exemplary server hardware is described below with reference to FIG. 9.

Cloud services server 130 can include an inbound mail system 131 that receives messages from a second client device 110 that are destined for a first client device 110, and an outbound mail system 132 that transmits messages received from a first client device 110 to a second device 110. The terms "mail" and "messages" are used interchangeably. Inbound and outbound mail can be stored in mail store 133. Mail received by mail store 133 is processed using normal mail processing, sending and receiving to/from client devices 110. Inbound mail system 131 can pass inbound mail to a mail encryption system 134 where it is encrypted using a key known to cloud services server 130 and data set server 140, but not client devices 110. Outbound mail system 132 can also pass outbound mail to mail encryption system 134 where the outbound mail is encrypted using a key known to cloud services server 130 and data set server 140. In an embodiment, mail encryption system 134 uses a symmetric key known to the cloud services server 130 and data set server 140 to encrypt the mail. Mail encryption system 134 can then pass one or more encrypted mail messages to encrypted private mail store 135 for storage for later processing by data set server 140. Functionality of the inbound mail system 131, outbound mail system 132, mail encryption system 134, and encrypted private mail store 135 can be implemented using one or more application programming interfaces (APIs) or application frameworks. APIs are described in detail, below, with reference to FIG. 6.

Data set server 140 can request a batch of encrypted private messages from cloud services server 130 encrypted private mail store 135. Data set server 140 can decrypt the received encrypted messages with mail decryption system 141 using a key shared between the cloud services server 130 and data set server 140. In an embodiment, the key is a symmetric key. Natural language processing (NLP) tokenization/tagging system 142 can request a batch of decrypted messages for each user having mail stored in encrypted private mail store 135 and process the batch of messages of each user. Processing each message can include removing headers and HTML tags, identifying metadata such as the language of the message, geographic location of the message, such as United States, Great Britain, China, etc. and parse the body text of the message. Parsing the body text of the message can include identifying personally identifiable information (PII), such as a name, phone number, email address, or other PII and replacing the PII with an appropriate tag, such as <name>, <phone number>, or <email address>. Parsed and tagged body text can be further broken into linguistic segments such as phrases, sentences, and the like. For example, "Bill's phone number is 800-555-1212" can be broken into tokenized as "<name> phone number is <phone number>." The tokenized sentence represents an n-gram, in this case a 4-gram because the sentence has 4 elements. The tokenized n-gram can be enriched by enrichment system 143 using, e.g. a specific user's calendar or contacts database to identify whether the message refers to the owner of the message. If the message is sent by Bill, the phrase "my phone number" refers to Bill's phone number. Thus, by looking up Bill's contact information in a "me" contacts entry of Bill's contacts file, the tagged n-gram can be enriched to "<me-name> phone number is <me-phone number>." Enriching the tokenized n-gram adds additional information to the tokenized n-gram without disclosing personally identifiable information. After enrichment, features can be extracted from the enriched tokenized message by feature extraction system 144, then encrypted and stored by feature set encryption 145. In an embodiment, functionality of systems 141-145 can be performed in-memory to reduce the possibility of an attack on user privacy. A feature set is a collection of feature vectors obtained from messages of a single user. Different users can have a substantially different count of feature vectors in their respective feature sets, depending upon the length and number of messages each user sent or received. In an embodiment, feature sets may be normalized before processing by the differential privacy engine 146, to ensure that noise injected by differential privacy engine 146 is sufficient to maintain a good signal to noise ratio of the feature vector sets while maintaining each user's privacy.

Differential privacy engine 146 (DPE 146) can read a batch of encrypted feature vector sets from memory or storage for processing. As described above, the batch of encrypted feature vector sets may be normalized before processing by DPE 146. In an embodiment, the particular differential privacy algorithm used by DPE 146 can be selected based upon the type of feature vectors in the feature set. In an embodiment, the particular differential privacy algorithm used can be selected based upon the source of the data used to generate feature vectors, e.g. email. DPE 146 can process a set of feature vectors sorted by order of n-gram length of the feature vectors in the feature vector set. Processing can include generating a differentially private sketch for each encrypted feature vector. Differentially private sketches of encrypted feature vectors of all feature vector sets can be accumulated to obtain a frequency of each differentially private encrypted feature vector over the batch of processed feature vector sets. The accumulated differentially private encrypted feature vectors can be filtered by discarding those differentially private encrypted feature vectors having an accumulated frequency less than a threshold number. In an embodiment, the threshold can determined based upon the total number of feature vectors processed. In an embodiment, the threshold number can be determined from the range of frequencies of differentially private encrypted feature vectors processed. In an embodiment, the threshold can be determined from a number of differentially private encrypted feature vectors having an accumulated frequency that is a specified number of standard deviations above the norm of frequencies for the accumulated differentially private encrypted feature vectors.

After filtering, the remaining differentially private encrypted feature vectors can be decrypted by feature set decryption system 147 and clear text of the feature vectors can be generated. In an embodiment, when a feature vector is extracted by feature extraction system 144, then encrypted by feature encryption 145, a copy of the clear text feature vector can be stored in encrypted form and differential privacy engine 146 can store a differentially private version of the encrypted feature vector in association with the clear text of the encrypted feature vector. Decrypting of a differentially private encrypted feature vector can then include looking up the clear text of the nearest matching differentially private encrypted feature vector generated and stored when the feature vector was first received, encrypted, and processed by the differential privacy engine 146. Asset catalog update system 148 can then generate an updated asset catalog using data sets generated by the clear text feature vectors that can be distributed to one or more client devices 110, for use in implementing predictive features on the client devices 110.

Figure 3:
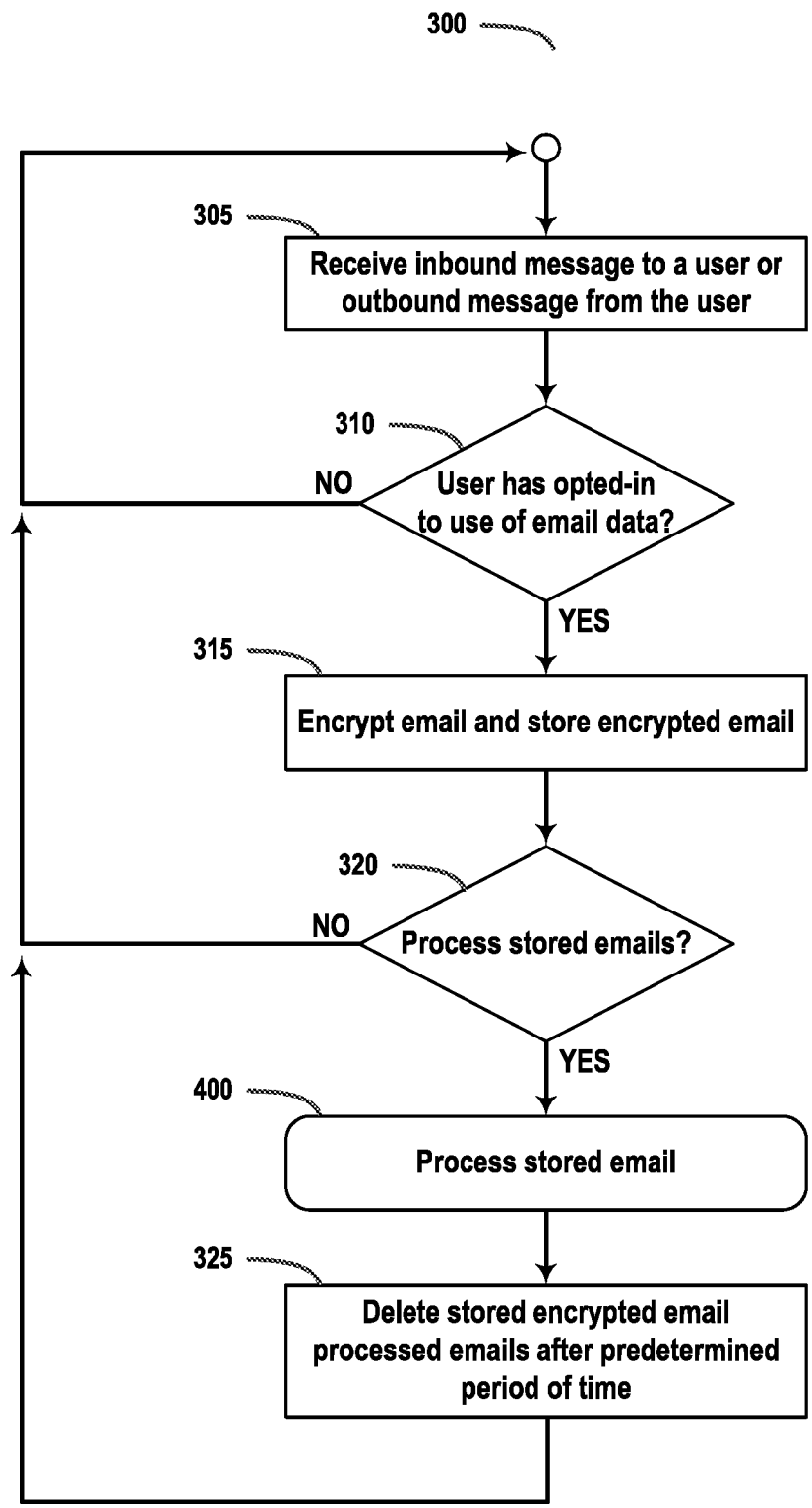
FIG. 3 illustrates, in block form, a method of storing emails of a plurality of clients in preparation for processing the emails to generate data sets for client use, according to some embodiments.

FIG. 3 illustrates, in block form, a method 300 of receiving and storing emails of a plurality of client devices 110 in preparation for processing the emails to generate data sets for client use, according to some embodiments.

In operation 305, inbound mail system 131 or outbound mail system 132 can receive a message from a user. The inbound mail system 131 or the outbound mail system 132 sends the message to the mail store 133 for normal message processing; i.e., the message is delivered to the recipient.

In operation 310, inbound mail system 131 or outbound mail system 132 can access account services system 138 to determine whether the user receiving the inbound message or sending the outbound message has opted-in to cloud services server 130 utilizing the user's messages to generate predictive data sets for use by client devices 110.

If, in operation 310, it is determined that the user has not opted in to use of her message data, then method 300 continues at operation 305, otherwise method 300 continues at operation 315.

In operation 315, inbound mail system 131 or outbound mail system 132 sends the message to mail encryption system 134 for encryption and storage in encrypted private mail store 135 for subsequent processing. In an embodiment, the message is encrypted using a key known to the cloud services server 130 and the data set server 140, but not the client devices 110.

In operation 320, it can be determined whether it is time to process accumulated, stored, encrypted messages. The determination can be made based on a predetermined period of time having elapsed, or a predetermined number of messages having been received, or a predetermined number of different users' messages having been received, or a combination of these.

If in operation 320 it is determined that it is not time to process accumulated, stored, encrypted messages, then method 300 continues at operation 305. Otherwise method 300 continues at operation 400.

In operation 400, each encrypted stored email is processed. Operation 400 is discussed in detail, below with reference to FIG. 4.

In operation 325, stored, encrypted messages can be deleted after a predetermined period. In an embodiment, the predetermined period is 30 days. In an embodiment, encrypted messages are stored in rolling 30-day window such that a message is deleted 30 days after it has been received, encrypted, and stored.

Figure 4:
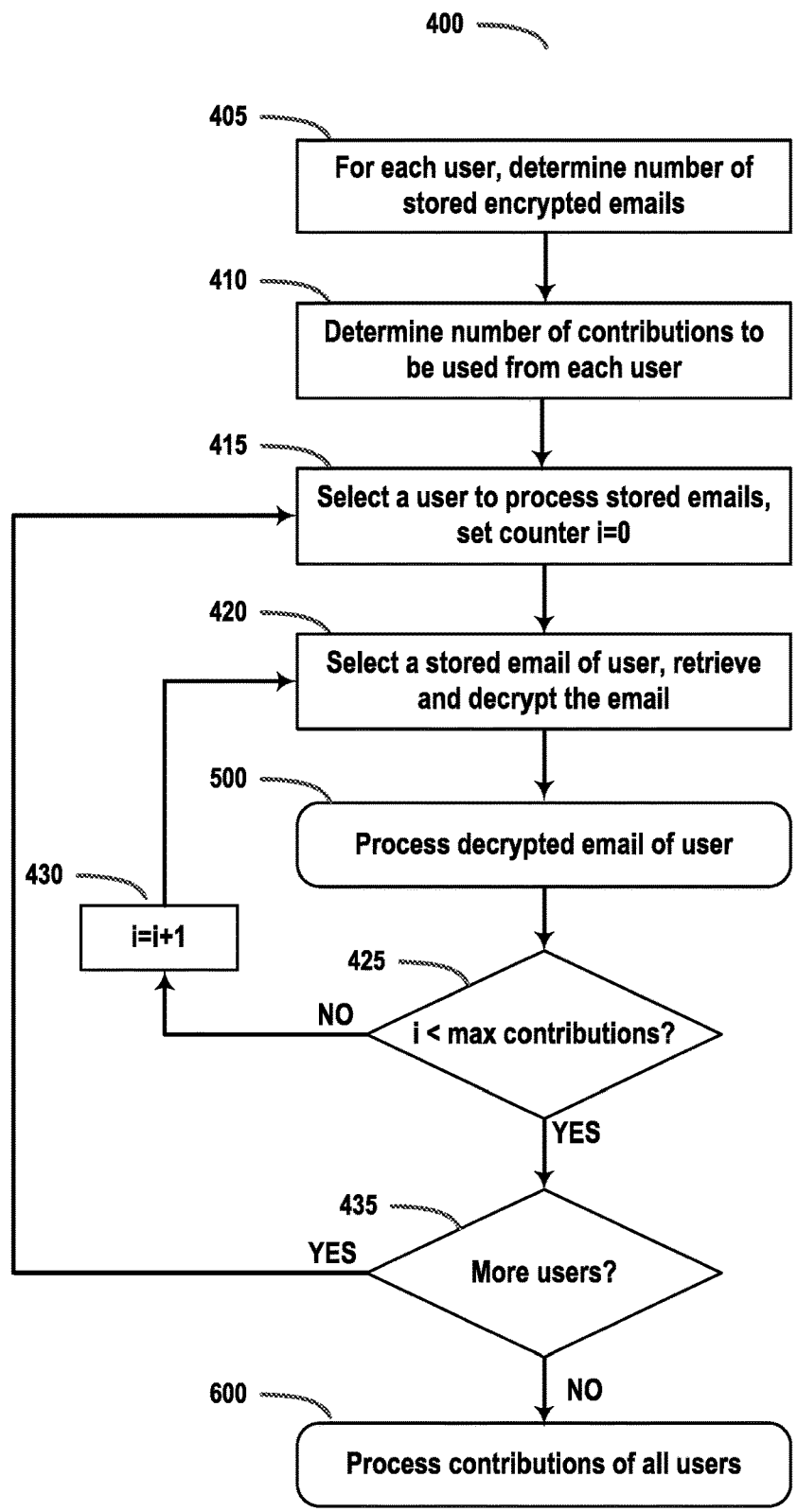
FIG. 4 illustrates, in block form, a method of processing stored encrypted email of a plurality of clients to generate data sets for client device use, according to some embodiments.

FIG. 4 illustrates, in block form, a method of operation 400, which processes stored email of a plurality of clients to generate data sets for client use, according to some embodiments. To preserve privacy, in an embodiment, a limited number of messages may be received from each user within a specified period of time. If more than the limited number are received, encrypted and stored, then only the limited number may be selected for further processing. Such selection can be random, ordered, first-in-first-out, last-in-first-out, or by other algorithm. Alternatively, all stored encrypted messages from each user can be processed, then normalized after processing to account for substantial differences in number and/or size of messages processed, to preserve user privacy. In the method described below, a limited number of stored encrypted messages is processed per user.

In operation 405, for each user having stored encrypted messages to be processed, determine a number of stored encrypted messages for the user.

In operation 410, a limited number of messages to be processed per user can be determined. For example, if one user has 10 stored encrypted messages and another user has 5000 stored encrypted messages, then a maximum number of messages per user may be, e.g. 250, for a given time period. Thus, all messages of the user having 10 encrypted stored messages will be processed and a maximum of 250 messages of the user having 5000 stored encrypted messages may be processed. As described above, various algorithms can be used to determine which 250 messages of the user having 5000 stored encrypted messages will be processed.

In operation 415, all stored encrypted messages for a first user can be selected for processing and a message counter, i, can be set to 0 (i=0). In an embodiment, the number of selected messages of the user can be limited to a maximum number of messages within a specified period of time, to preserve user privacy.

In operation 420, a first stored encrypted message of the user can be selected, retrieved and decrypted by mail decrypted system 141. The encrypted message can be decrypted using a shared key known to the cloud services server 130 and data set server 140. In an embodiment the key is a symmetric key that was used to encrypt the message by mail encrypted system 134.

In operation 500, the decrypted message can be processed. Operation 500 is described in detail below with reference to FIG. 5.

In operation 425 it can be determined whether the maximum number of messages has been processed for this user (i<max. contributions). If in operation 425 it is determined that the maximum number of contributions for this user has not been met and the user still has more messages to process, method 400 continues at operation 430. Otherwise method 400 continues at operation 435.

In operation 430, the per-user contribution counter is incremented and method 400 continues at operation 420.

In operation 435, it can be determined whether there are more users having messages to process. If so, then method 400 continues at operation 415. Otherwise method 400 continues at operation 600.

In operation 600, the processed contributions of all users are processed. Operation 600 is described in detail below with reference to FIG. 6.

Figure 5:
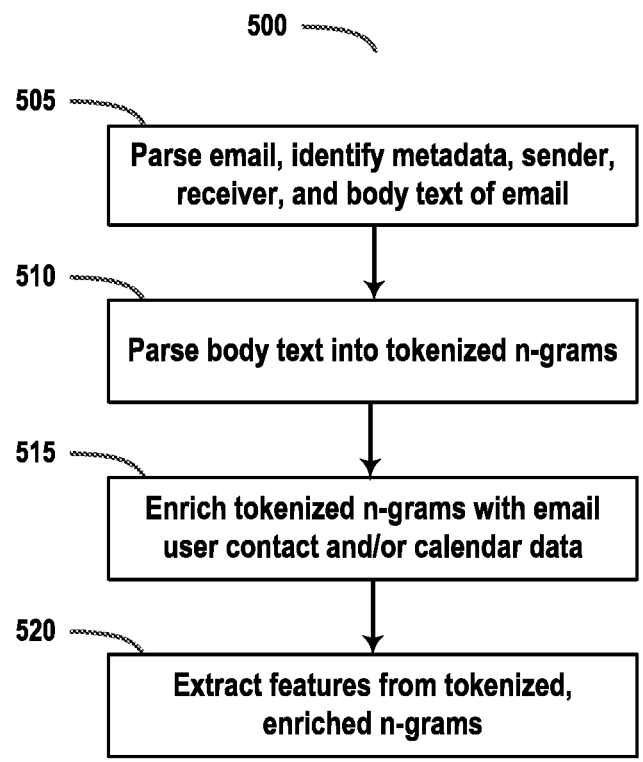
FIG. 5 illustrates, in block form, a method of extracting features from email for use in generating data sets for client device use, according to some embodiments.

FIG. 5 illustrates, in block form, a method of operation 500 for extracting features from a message for use in generating data sets for client use, according to some embodiments. An example of a processing a message is described below with reference to FIGS. 7A-7D.

In operation 505, a decrypted email of a user can be parsed to identify metadata of the message and to extract the body text of the message. Metadata can include the language of the message, e.g. US-English, UK-English, Spanish, Japanese, Chinese, etc. and geo-location of the message (China, United States, United Kingdom, etc.). Metadata can further include the identification of the sender and receiver of the message. Sender and receiver can be used to determine an owner of the message and whether the sender or receiver has an account 138, calendar 137, and/or private contacts database 136 associated with the user.

In operation 510, the body text of the message can be parsed into n-grams; portions of text having "n" elements, wherein n is a positive integer. Body text can contain n-grams of different lengths. Personally identifiable information (PII) can be removed from the n-grams by tokenizing the PII. Proper names can be replaced with the tag <name>, phone numbers can be replaced with the tag <phone number>, locations can be replaced with the tag <location>, and times and dates can be replaced with the tags <time> and <date> respectively. Other tags for other PII can be used to remove PII from the tokenized n-gram message body text.

In operation 515, tokenized n-grams of body text can optionally be enriched by enrichment system 143, using data sources external to the message. For example, a sender or receiver of the message can have a calendar 137 and/or contacts database 136 associated with the sender or receiver which can be accessed to enrich a tag. If Bill is a sender of the message, and the message text includes the n-gram, "My number is 800-555-1212" or "Bill's number is 800-555-1212" then the tokenized n-gram can be "<name> number is <phone number>." Since Bill is the sender of the message and has a contacts database 136 record for himself (a "me" record), the enriched tokenized n-gram can be "<my-name> number is <my-phone number>." The enriched tokenized n-gram contains more useful information while preserving Bill's privacy.

In operation 520, feature extraction system 144 can extract features from (optionally) enriched, tokenized n-grams of parsed message body text, each having a frequency of occurrence in the parsed message. In an example, the message text body may contain the text, "Bill likes pizza. Bob likes pizza. Let's have pizza." The tokenized message body text may include two instances of "<name> likes pizza." A feature vector may be extracted (name, likes, pizza, freq:2), in addition to other feature vectors that may occur in the rest of the message text body. The specific form of representation of a feature can vary depending on the type of machine learning algorithm that will be applied to the extracted features.

Figure 6:
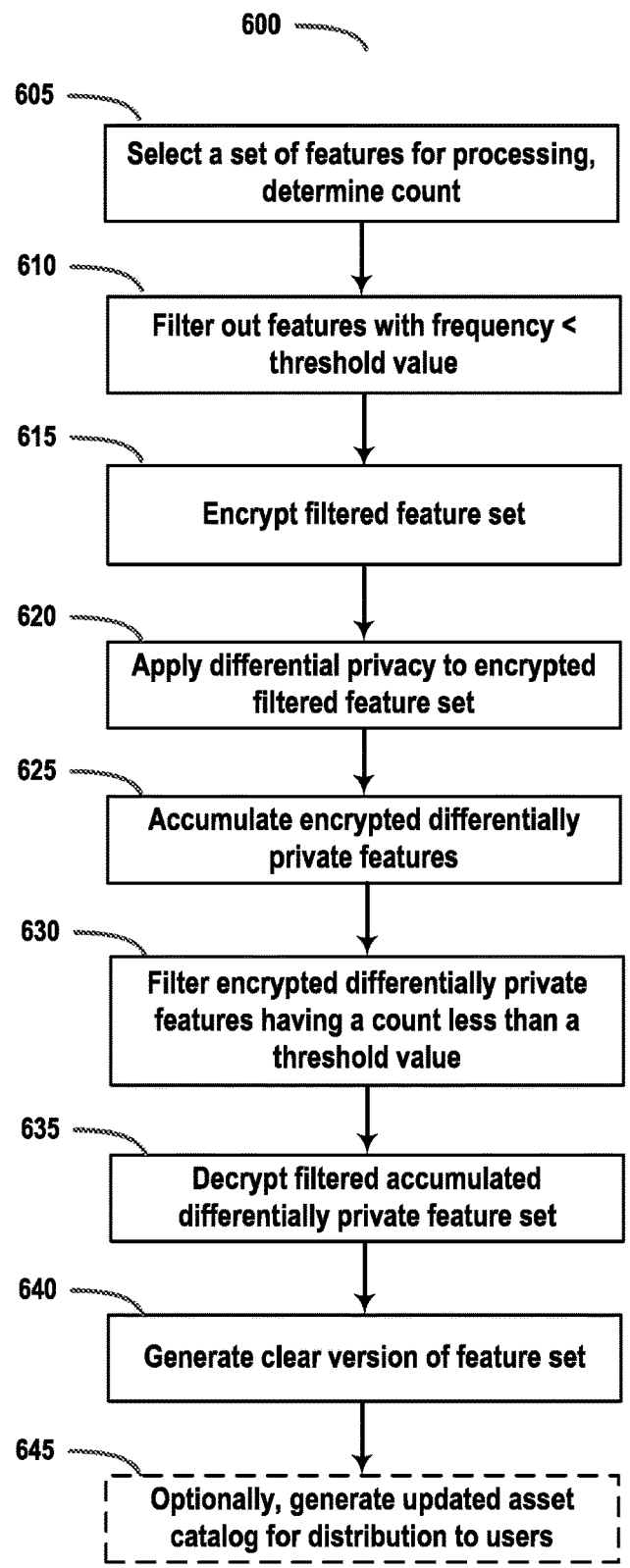
FIG. 6 illustrates, in block form, a method of processing features extracted from a plurality of emails for use in generating data sets for client device use, according to some embodiments.

FIG. 6 illustrates, in block form, a method of operation 600 to process features extracted from a plurality of emails of a plurality of users for use in generating data sets that will be used to implement predictive features for use on client devices 110, according to some embodiments. Method 600 processes feature sets of a large plurality of users, each feature set containing features extracted from a single user's messages. Each feature set can contain features of varying length. Different users may have substantially larger, or smaller, feature set sizes than other users based upon the number and/or size of emails generated by the user, and this can affect user privacy. For example, one user may have sent 50 short messages and another may have sent 500 long messages. Prior to processing feature sets in method 600, the feature sets of different users can be normalized to ensure that contribution of each user is approximately of a similar size, so that no user's feature contribution is substantially larger or smaller than another user.

In operation 605, a set of features for processing can be selected and a count of features can be determined.

In operation 610, all features in the user feature sets can be encrypted. The encryption key can be a key known to the cloud services server 130 and data set server 140, and not known to the client devices 110. In an embodiment, the key is a symmetric key. In an embodiment, when a feature vector is encrypted for the first time, a lookup database can be generated that stores a copy of the feature vector, an encrypted version of the feature vector, and a differentially private encrypted version of the feature vector in association with one another. These can be used later to generate a clear version of a differentially private encrypted feature.

In operation 615, differential privacy engine 146 (DPE 146) can optionally determine a differential privacy algorithm to use to process the encrypted feature set. In an embodiment, the differential privacy algorithm can be determined by the type of features in the feature set, or the application that generated the data used for generating the feature set. For example, a different differential privacy algorithm may be used for textual data, audio data, or image data.

In operation 620, the selected differential privacy algorithm can be applied to each encrypted feature vector in each user feature set.

In operation 625, each differentially private encrypted feature vector can be aggregated with other matching differentially private encrypted feature vectors to produce an aggregate set of differentially private encrypted feature vectors over all user feature sets, with each aggregated differentially private encrypted feature vector having a frequency of that differentially private encrypted feature vector.

In operation 630, the differential privacy engine 146 can determine a threshold frequency value with which to filter the aggregate differentially private encrypted feature vectors. If the frequency of a differentially private encrypted feature vector is less than the threshold filter value, then the differentially private encrypted feature vector can be discarded. In an embodiment, the threshold filter value can be determined as a number of standard deviations above the norm of frequencies of the differentially private encrypted feature vectors, e.g. +2 standard deviations. In an embodiment, the threshold filter value can be a percentage of the highest frequency value in the aggregated differentially private encrypted feature vectors. The threshold filter value ensures that an appropriate signal-to-noise ratio is maintained to ensure both user privacy and machine learning efficacy, and to keep the resulting aggregated differentially private encrypted feature set to a useful size.

In operation 635, the filtered differentially private encrypted feature vectors can be decrypted using the symmetric key that was used to encrypt the feature vectors.

In operation 640, a clear version of the decrypted differentially private feature set can be generated, using the lookup feature set generated in operation 610 at encryption of feature vectors.

In operation 645, asset catalog update system 148 can optionally generate a data set for export to update an asset catalog for distribution to client devices, to implement features on client devices.

FIGS. 7A-7D illustrate tokenizing an n-gram and enriching the tokenized n-gram according to some embodiments.

FIG. 7A represents an example message sent from user Christina to user Giulia. The message contains personally identifiable information, such as names, dates, phone numbers and locations.

FIG. 7B illustrates a tokenized version of the example message of FIG. 7A. Names have been replaced with the tag <name>, dates have been replaced with the tag <date>, locations have been replaced with the tag <location>, and phone numbers have been replaced with the tag <phone number>.

FIG. 7C illustrates an enriched version of the tokenized text of FIG. 7B. In a second pass parsing of the body text of message of FIG. 7A. In FIG. 7C, sentence boundaries have been added, and Christina's phone number has been enriched with the tag <my-phone number>. The tag <my-phone number> vs. just <phone number> can be determined by parsing the words of the sentence with reference to the sender of the message. In an embodiment, the tag <my-phone number> can be determined by looking up Christina's "me" information in Christina's private contacts database 136.

FIG. 7D illustrates an aggregation of features found in a large plurality of user feature sets processed on Jul. 15, 2016.

Figure 8:
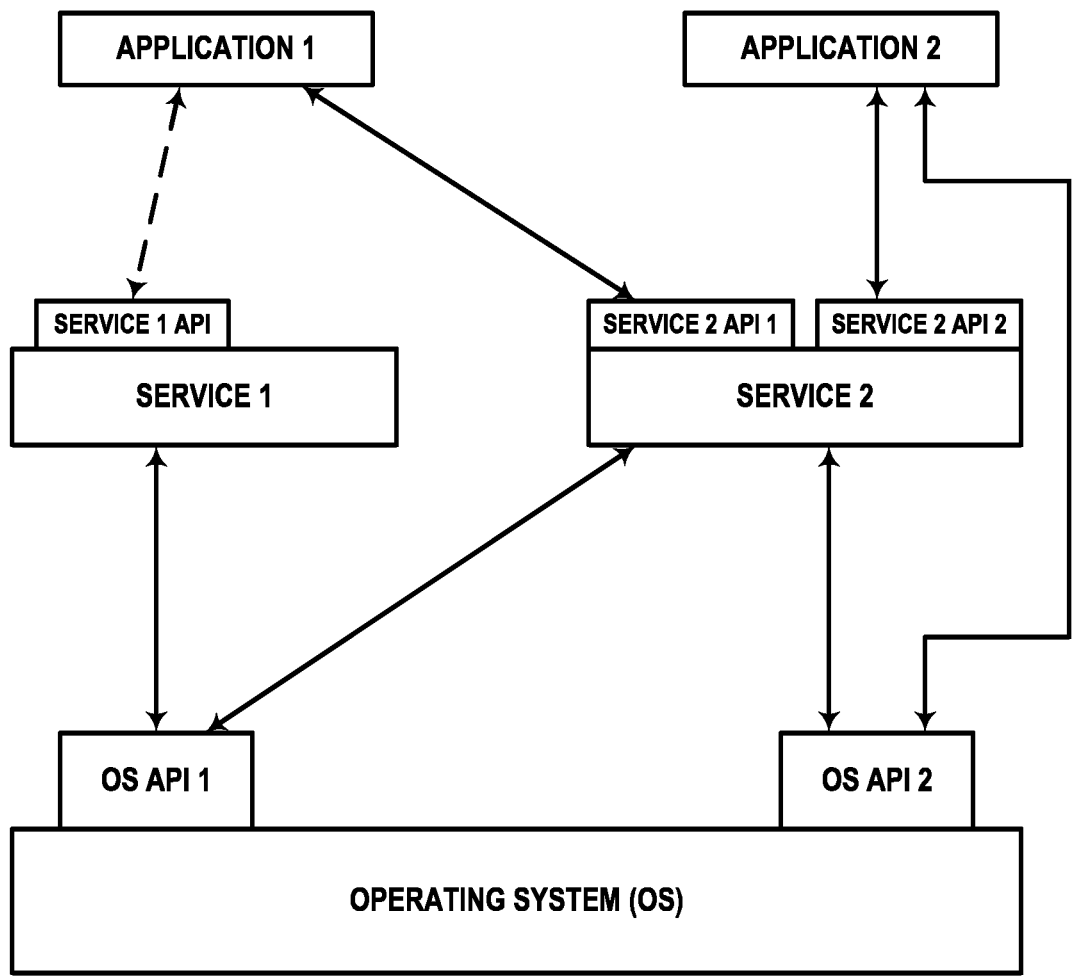
FIG. 8 illustrates an exemplary embodiment of a software stack usable in some embodiments of the invention.

In FIG. 8 ("Software Stack"), an exemplary embodiment, applications can make calls to Services 1 or 2 using several Service APIs and to Operating System (OS) using several OS APIs. Services 1 and 2 can make calls to OS using several OS APIs.

Note that the Service 2 has two APIs, one of which (Service 2 API 1) receives calls from and returns values to Application 1 and the other (Service 2 API 2) receives calls from and returns values to Application 2, Service 1 (which can be, for example, a software library) makes calls to and receives returned values from OS API 1, and Service 2 (which can be, for example, a software library) makes calls to and receives returned values from both as API 1 and OS API 2, Application 2 makes calls to and receives returned values from as API 2.

Figure 9:
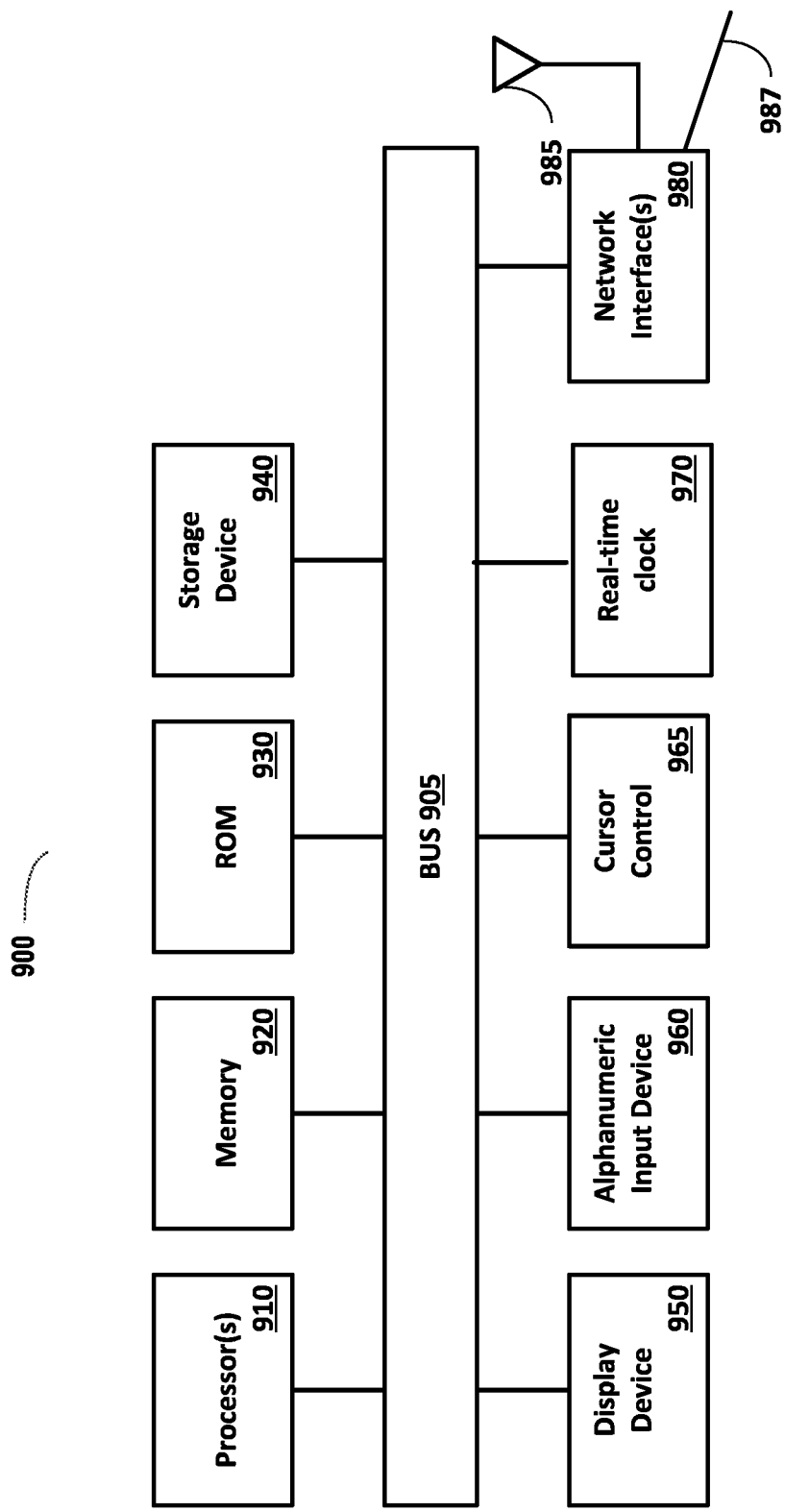
FIG. 9 is a block diagram of one embodiment of a computing system for implementing the functionality described herein.

FIG. 9 is a block diagram of one embodiment of a computing system 900. The computing system illustrated in FIG. 9 is intended to represent a range of computing systems (either wired or wireless) including, for example, desktop computer systems, laptop computer systems, tablet computer systems, cellular telephones, personal digital assistants (PDAs) including cellular-enabled PDAs, set top boxes, entertainment systems or other consumer electronic devices. Alternative computing systems may include more, fewer and/or different components. The computing system of FIG. 9 may be used to provide the computing device and/or the server device.

Computing system 900 includes bus 905 or other communication device to communicate information, and processor 910 coupled to bus 905 that may process information.

While computing system 900 is illustrated with a single processor, computing system 900 may include multiple processors and/or co-processors 910. Computing system 900 further may include random access memory (RAM) or other dynamic storage device (referred to as main memory 920), coupled to bus 905 and may store information and instructions that may be executed by processor(s) 910. Main memory 920 may also be used to store temporary variables or other intermediate information during execution of instructions by processor 910.

Computing system 900 may also include read only memory (ROM) 930 and/or other static data storage device 940 coupled to bus 905 that may store static information and instructions for processor(s) 910. Data storage device 940 may be coupled to bus 905 to store information and instructions. Data storage device 940 such as flash memory or a magnetic disk or optical disc and corresponding drive may be coupled to computing system 900.

Computing system 900 may also be coupled via bus 905 to a display device 950, such as a light emitting diode (LED) or liquid crystal display (LCD), to display information to a user. Computing system 900 can also include an alphanumeric input device 960, including alphanumeric and other keys, which may be coupled to bus 905 to communicate information and command selections to processor(s) 910. Another type of user input device is cursor control 965, such as a touchpad, a mouse, a trackball, or cursor direction keys to communicate direction information and command selections to processor(s) 910 and to control cursor movement on display 950. Computing system 900 may also include a real-time clock 970 and receive user input from a remote device that is communicatively coupled to computing system 900 via one or more network interface(s) 980.

Computing system 900 further may include one or more network interface(s) 980 to provide access to a network, such as a local area network. Network interface(s) 980 may include, for example, a wireless network interface having antenna 985, which may represent one or more antenna(e). Computing system 900 can include multiple wireless network interfaces such as a combination of WiFi, Bluetooth® and cellular telephony interfaces. Network interface(s) 980 may also include, for example, a wired network interface to communicate with remote devices via network cable 987, which may be, for example, an Ethernet cable, a coaxial cable, a fiber optic cable, a serial cable, or a parallel cable.

In one embodiment, network interface(s) 980 may provide access to a local area network, for example, by conforming to IEEE 802.11 b and/or IEEE 802.11 g standards, and/or the wireless network interface may provide access to a personal area network, for example, by conforming to Bluetooth standards. Other wireless network interfaces and/or protocols can also be supported. In addition to, or instead of, communication via wireless LAN standards, network interface(s) 980 may provide wireless communications using, for example, Time Division, Multiple Access (TDMA) protocols, Global System for Mobile Communications (GSM) protocols, Code Division, Multiple Access (CDMA) protocols, and/or any other type of wireless communications protocol.

Embodiments described herein enable data associated with a large plurality of users to be analyzed without compromising the privacy of the user data. In one embodiment, a user can opt-in to allow analysis of clear text of the user's emails. An analysis process can then be performed in which an analysis service receives clear text of an email of a client device; processes the clear text of the email into one or more tokens having one or more tags; enriches one or more tokens in the processed email using data associated with a user of the client device and the one or more tags; and processes the clear text and one or more enriched tokens to generate a data set of one or more feature vectors.

One embodiment provides for a computer-implemented method comprising receiving, by a service, clear text of an email of a client device; processing, by the service, the clear text of the email into one or more tokens having one or more tags; enriching one or more tokens in the processed email using data associated with a user of the client device and the one or more tags; and processing the clear text and one or more enriched tokens to generate a data set of one or more feature vectors. In one embodiment, the method additionally comprises encrypting the clear text of the email, in response to receiving the email; storing the encrypted email; and decrypting the encrypted email before processing the clear text of the email.

One embodiment provides for a non-transitory computer readable medium can store executable instructions, that when executed by a processing system, can perform any of the functionality described above.

In yet another embodiment, a processing system coupled to a memory is provided. The memory is programmed with executable instructions which, when the instructions are executed by the processing system, cause the processing system to perform any of the functionality described above.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A computer-implemented method comprising:
receiving, by a service, clear text of an email of a client device;
processing, by the service, the clear text of the email into a processed email, wherein processing the clear text of the email includes parsing the clear text into one or more tokenized sentence segments including one or more tags, and wherein the one or more tags privatize personally identifiable information within the clear text of the email;
enriching the one or more tokenized sentence segments in the processed email using data from an application specific to a user of the client device and the one or more tags, wherein enriching the tokenized sentence segments comprises:
accessing, from the application on the client device, the data specific to the user of the client device;
comparing the clear text associated with the one or more tags with the data associated with the user of the client device; and in response to determining a match between the clear text and the data associated with the user of the client device:
replacing, by the service, at least one of the one or more tags with an enriched tag, wherein the enriched tag is created by modifying the at least one or more tags to include the data from the application specific to the user of the client device.

2. The method of claim 1, further comprising:
in response to receiving the email, encrypting the clear text of the email into an encrypted email;
storing the encrypted email; and
decrypting the encrypted email before processing the clear text of the email.

3. The method of claim 1, wherein the user of the client device has opted-in to usage, by the service, of emails of the user, and the data associated with the user of the client device comprises one or more of a calendar and a contacts list.

4. The method of claim 1, further comprising:
processing the clear text, the one or more tags, and the enriched tag to generate a data set of one or more feature vectors;
encrypting the data set of one or more feature vectors;
generating a privatized data set from the encrypted data set, wherein the privatized data set includes a differentially private sketch for each feature vector;
accumulating the differentially private sketches to obtain a frequency of each differentially private feature vector over a batch of processed feature vector sets; and
discarding one or more differentially private feature vectors having an accumulated frequency less than a threshold.

5. The method of claim 4, further comprising:
selecting one or more encrypted feature vectors from the privatized data set;
decrypting the selected, encrypted one or more feature vectors; and
transmitting the decrypted one or more feature vectors as the data set of feature vectors to the client device within an asset catalog update for the client device.

6. The method of claim 5, wherein the asset catalog includes a feature vector to enable the client device to automatically generate a contact entry in response to detecting that the user has typed text matching the feature vector.

7. The method of claim 4, wherein the data set of feature vectors is used by a natural language processing feature of an application.

8. The method of claim 4, wherein the data set of feature vectors is used by a predictive text feature of an application.

9. The method according to claim 1, wherein the application on the client device that is specific to the user comprises a user calendar or a user contacts database.

10. A non-transitory computer readable medium programmed with instructions that, when executed by a processing system, cause the processing system to perform operations comprising:
receiving, by a service, clear text of an email of a client device;
processing, by the service, the clear text of the email into a processed email, wherein processing the clear text of the email includes parsing the clear text into one or more tokenized sentence segments including one or more tags, wherein the one or more tags privatize personally identifiable information within the clear text of the email;

enriching the one or more tokenized sentence segments in the processed email using data from an application specific to a user of the client device and the one or more tags, wherein enriching the tokenized sentence segments comprises:
accessing, from the application on the client device, the data specific to the user of the client device;
comparing the clear text associated with the one or more tags with the data associated with the user of the client device; and
in response to determining a match between the clear text and the data associated with the user of the client device, replacing, by the service, at least one of the one or more tags with an enriched tag, wherein the enriched tag is created by modifying the at least one or more tags to include the data from the application specific to the user of the client device.

11. The non-transitory computer readable medium of claim 10, the operations further comprising:
encrypting the clear text of the email, in response to receiving the email, the clear text of the email encrypted into an encrypted email;
storing the encrypted email; and
decrypting the encrypted email before processing the clear text of the email.

12. The non-transitory computer readable medium of claim 10, the user of the client device having opted-in to usage, by the service, of data associated with the user of the client device, the data associated with the user of the client device including e-mail and one or more of: a calendar and a contacts list.

13. The non-transitory computer readable medium of claim 10, the operations further comprising:
processing the clear text, the one or more tags and the enriched tag to generate a data set of one or more feature vectors;
encrypting the data set of one or more feature vectors;
generating a privatized data set from the encrypted data set, wherein the privatized data set includes a differentially private sketch for each feature vector;
accumulating the differentially private sketches to obtain a frequency of each differentially private feature vector over a batch of processed feature vector sets; and
discarding one or more differentially private feature vectors having an accumulated frequency less than a threshold
selecting one or more encrypted feature vectors from the privatized data set; decrypting the selected, encrypted one or more feature vectors; and
transmitting the decrypted one or more feature vectors as the data set of feature vectors to the client device within an asset catalog update for the client device.

14. The non-transitory computer readable medium of claim 13, wherein the asset catalog includes a feature vector to enable the client device to automatically generate a contact entry in response to detecting that the user has typed text matching the feature vector.

15. The non-transitory computer readable medium of claim 13, wherein the data set of feature vectors is used by a natural language processing feature of an application or a predictive text feature of an application.

16. A system comprising:
a non-transitory machine-readable medium storing instructions;
a processing system to execute instructions stored on the non-transitory machine-readable medium, the instructions to cause the processing system to:
receive clear text of an email of a client device;
process the clear text of the email into a processed email, the processed email including one or more tokens having one or more tags, wherein to process the clear text of the email includes to parse the clear text into one or more tokenized sentence segments including one or more tags, wherein the one or more tags privatize personally identifiable information within the clear text of the email;
enrich the one or more tokenized sentence segments in the processed email using data from an application specific to a user of the client device and the one or more tags, wherein to enrich the tokenized sentence segments comprises:
accessing, from the application on the client device, the data specific to the user of the client device;
comparing the clear text associated with the one or more tags with the data associated with the user of the client device; and
in response to determining a match between the clear text and the data associated with the user of the client device, replacing at least one of the one or more tags with an enriched tag, wherein the enriched tag is created by modifying the at least one or more tags to include the data from the application specific to the user of the client device.

17. The system of claim 16, the processing system further to:
encrypt the clear text of the email, in response to receiving the email;
store the encrypted email; and
decrypt the encrypted email before processing the clear text of the email.

18. The system of claim 16, the user of the client device having opted-in to usage of data associate with the user, the data associated with the user of the client device including email and one or more of a calendar and a contacts list.

19. The system of claim 16, the processing system further to:
process the clear text, the one or more tags and enriched tag to generate a data set of one or more feature vectors;
encrypt the data set of one or more feature vectors;
generate a privatized data set from the one or more feature vectors, wherein
the privatized data set includes a differentially private sketch for each feature vector;
accumulate the differentially private sketches to obtain a frequency of each differentially private feature vector over a batch of processed feature vector sets;
discard one or more differentially private feature vectors having an accumulated frequency less than a threshold;
select one or more encrypted feature vectors from the privatized data set;
decrypt the encrypted one or more feature vectors into decrypted one or more feature vectors; and
transmit the decrypted one or more feature vectors as the data set of feature vectors to the client device within an asset catalog update for the client device.

20. The system as in claim 19, wherein the asset catalog includes a feature vector to enable the client device to automatically generate a contact entry in response to detecting that the user has typed text matching the feature vector.

21. The system of claim 19, the data set of feature vectors to be used by a natural language processing feature of an application or a predictive text feature of an application.

* * * * *

UNITED STATES PATENT AND TRADEMARK OFFICE
CERTIFICATE OF CORRECTION

PATENT NO. : 11,496,286 B2  
APPLICATION NO. : 15/815611  
DATED : November 8, 2022  
INVENTOR(S) : William T. Duffy et al.

Page 1 of 1

It is certified that error appears in the above-identified patent and that said Letters Patent is hereby corrected as shown below:

In the Claims

Column 17, Claim 13, Lines 43, delete "over a batch of processed feature vector sets; and" and insert --over a batch of processed feature vector sets;--

Column 17, Claim 13, Lines 46, delete "threshold" and insert --threshold;--

Signed and Sealed this  
Twenty-fourth Day of January, 2023

Katherine Kelly Vidal  
*Director of the United States Patent and Trademark Office*